June 14, 1960     H. V. HUGHES     2,940,728
CABLE SPLICING STAND

Filed Dec. 6, 1957     2 Sheets-Sheet 1

INVENTOR
Howard V. Hughes

June 14, 1960
H. V. HUGHES
2,940,728
CABLE SPLICING STAND
Filed Dec. 6, 1957
2 Sheets-Sheet 2
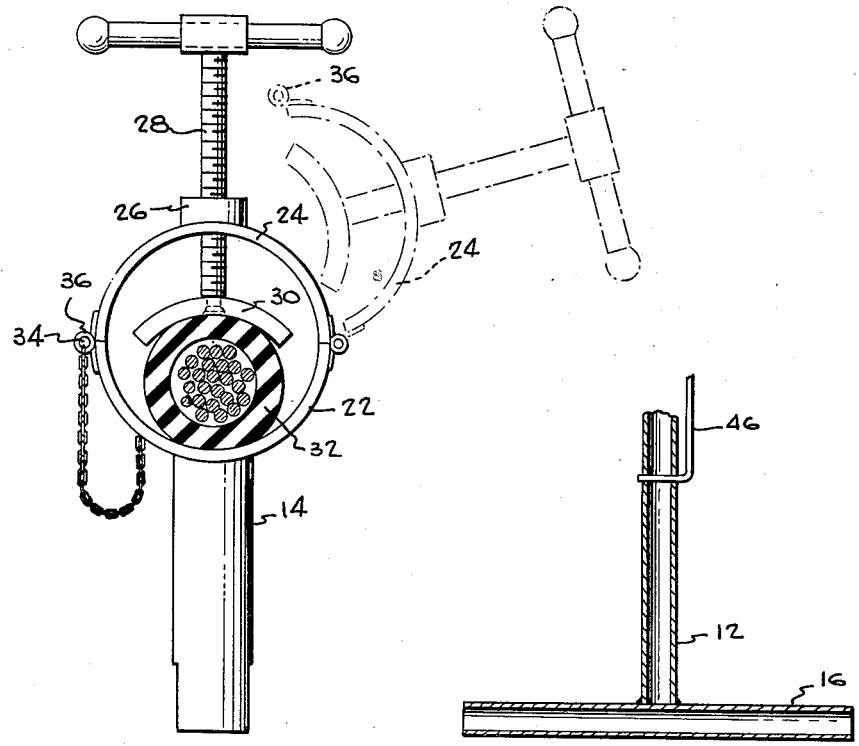
Fig. 3
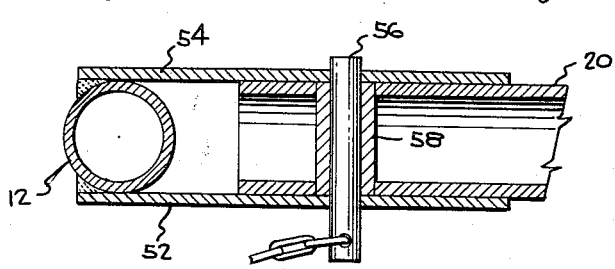
Fig. 4
Fig. 5
INVENTOR
Howard V. Hughes
BY
ATTORNEYS

2,940,728
CABLE SPLICING STAND

Howard V. Hughes, R.R. 1, Winslow, Ind.

Filed Dec. 6, 1957, Ser. No. 701,204

3 Claims. (Cl. 254—81)

The present invention relates to a stand for use in splicing a cable.

An object of the present invention is to provide a stand for use in splicing a cable which lends itself to ready portability, and one which may be assembled and disassembled with facility and ease.

Another object of the present invention is to provide a stand for use in splicing a cable which lends itself to holding the cable in a taut condition and in such a manner as to enable the user to make repairs to the cable efficiently and with facility.

A further object of the present invention is to provide a stand for use in splicing a cable which is sturdy in construction, one simple in structure, one economically feasible, and one which is highly effective in action.

These and other objects and advantages of the present invention will be fully apparent from the following description when taken in connection with the annexed drawings, in which:

Figure 3 is an elevational view of the clamping means used with the stand of the present invention, the dotted line showing indicating the open position of the clamping means;

Figure 4 is a fragmentary sectional view, on an enlarged scale, taken on the line 4—4 of Figure 2; and Figure 5 is a fragmentary sectional view, on an enlarged scale, taken on the line 5—5 of Figure 1.

Figure 1:
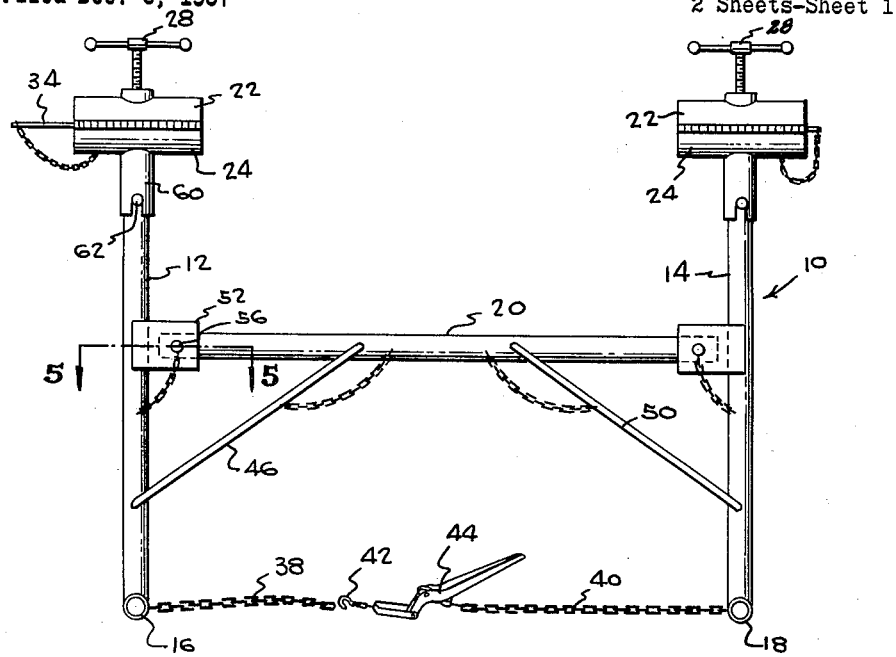
Figure 1 is an elevational view of the stand of the present invention shown in erected condition before attaching a cable thereto.
Figure 2:
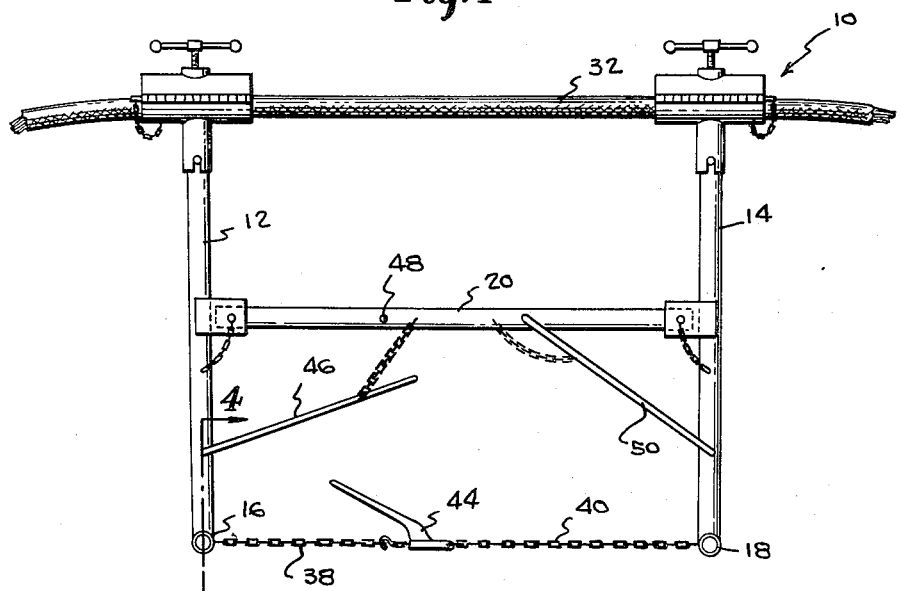
Figure 2 is an elevational view of the assembly of Figure 1, showing a cable secured to the stand and the stand uprights spread apart at the top to pull the cable to a taut condition.

Referring in greater detail to the drawings in which like numerals indicate like parts throughout the several views, the reference numeral 10 designates generally the cable splicing stand of the present invention which comprises a pair of uprights 12 and 14 arranged in linear spaced relation with a foot 16 on the lower end of the upright 12 and a foot 18 on the lower end of the upright 14.

A one-piece cross bar 20 extends between the uprights 12 and 14 intermediate the ends of such uprights and has one end detachably secured to the upright 12 and has the other end detachably secured to the other upright 14. Clamp means is provided on the upper end of each of the uprights 12 and 14 and embodies a pair of horizontally disposed semicylindrical members 22 and 24 arranged in face to face relation and connected along one of their adjacent side edges for swinging movement from the face to face relation position to a position in which the other side edges are apart from each other, as shown in dotted lines in Figure 3, with reference to the clamp means which is on the upper end of the upright 14. All of the other clamp means are similarly constructed.

A threaded boss 26 is provided on each of the semicylindrical members 24 for threadedly supporting the hand screw 28 extending therethrough, the inner end of the hand screw 28 having a wedge block 30 thereon for clamping a cable 32 against the inner face of the semicylindrical member 22.

A locking pin 34 extends through aligned eye formations 36 provided on the mating edges of the members 22 and 24 for holding the members 22 and 24 in face to face assembled condition.

Means is provided connecting one end of the uprights 12 and 14 together, such means comprising a link chain 38 having one end connected to the lower end of the upright 12 and another link 40 has the one end attached to the upright 14 and has the other end attached to an over-center lever 44. The lever 44 has a U-shaped link to which is attached a hook 42, the hook being detachably engageable with the last link on the other end of the chain 38.

Brace means is provided carried by each of the uprights 12 and 14 and detachably engageable with means provided on the cross bar 20 for holding the uprights 12 and 14 in the upstanding position. Such brace means comprises a first brace 46 having one end pivotally connected to the upright 12 below the cross bar 20 and having its other end engageable in an aperture 48 provided in the adjacent portion of the cross bar 20. Another brace 50 is similarly connected to the upright 14 and the adjacent portion of the cross bar 20.

A pair of upright plates 52 and 54 are secured in vertical spaced relation one on each side of each of the uprights 12 and 14, as shown in Figure 5 with respect to the upright 12 and form a means of connection of the cross bar 20 thereto for pivotal movement about a pin 56 as a horizontal axis. The pin 56 is removably insertable through holes provided in the plates 52 and 54 and through a sleeve 58 which is arranged transversely in a bore provided in the cross bar 20 inwardly of the adjacent end thereof.

When the braces 46 and 50 are removed the uprights 12 and 14 are swingable about the adjacent pin 56 as a horizontal axis.

A vertically disposed sleeve 60 is welded to the underside of each of the semicylindrical members 24 and is provided with a slot in the lower end thereof receiving a pin 62 fixed to the adjacent uprights 12 or 14. This forms a loose connection by means of which the clamping means for each upright 12 or 14 is removable therefrom for storage and portability.

In operation, with the stand set up as in Figure 1, the pin 34 in each of the clamp means is pulled out, the members 22 are swung from the full line position in Figure 3 to the dotted line position in such figure, and a cable containing a hole in the protective sheath to be repaired is stretched between and laid upon the members 24. At this point, the members 22 are swung back to the full line positions of Figure 3, the pins 34 reinserted in the members 22 and 24, and the hand screws 28 tightened until the shoes 30 engage the cable. The jacket about the hole is then opened up so as to expose the core wires and the wires spliced. With the completion of the wire splicing either one of the braces 46 or 50 is disconnected from the cross bar 20, permitting the uprights 12 and 14 to move slightly relative to each other, whereupon the insulation is placed about the spliced wires. With the insulation placed about the spliced wires the hook 42 is inserted into a link of the chain 38, and the over center lever 44 is actuated to place the supported cable under tension. While the cable is under tension the insulation is jacketed as by taping. The placing of the cable under tension while applying the jacket makes the taping easier and forms a better jacket. With the cable thus repaired the lever 44 is operated to the release position, the hook 42 detached from the link in the chain 38, the screws 28 released, the pins 34 removed, the members 22 swung to the dotted line position of Figure 3, and the repaired cable removed from support upon the members 24.

While only a single embodiment of the present invention has been shown and described, other embodiments are contemplated and numerous changes and modifications may be made therein without departing from the spirit of the invention as set forth in the appended claims.

What is claimed is:

1. A stand for use in splicing cables comprising a pair of uprights arranged in linear spaced relation, a foot on the lower end of each of said uprights adapted to engage a ground surface, a pair of upright plates secured in spaced relation on each of said uprights intermediate the ends thereof, a one-piece cross bar extending between the pairs of upright plates and having one end detachably and pivotally secured to the pair of upright plates of one of said uprights and having the other end detachably and pivotally secured to the pair of upright plates of the other of said uprights, a clamp means on the upper end of each of said uprights, said clamp means being in linear alignment and adapted to have a portion of a cable to be spliced extending therethrough, brace means carried by each of said uprights and detachably engageable with means provided on said cross bar, means connecting the lower ends of said uprights together, and tightening means operatively connected to said connecting means for applying tension to said connecting means and thereby pull the cable portion to a taut condition when extending through said clamp means.

2. A stand for use in splicing cables comprising a pair of uprights arranged in linear spaced relation, a foot on the lower end of each of said uprights and adapted to engage a ground surface, a pair of upright plates secured in spaced relation on each of said uprights intermediate the ends thereof, a one-piece cross bar extending between the pairs of upright plates and having one end detachably and pivotally secured to the pair of upright plates of one of said uprights and having the other end detachably and pivotally secured to the pair of upright plates of the other of said uprights, a clamp means on the upper end of each of said uprights, said clamp means being in linear alignment and adapted to have a portion of a cable to be spliced extending therethrough, means connecting the lower ends of said uprights together, said connecting means embodying a link chain carried by the lower end of one of said uprights, another link chain carried by the lower end of the other of said uprights, tightening means on the free end of one of said chains for applying tension to said connecting means and thereby pull the cable portion to a taut condition when extended through said clamp means, and a hook on said tightening means and detachably engageable with the link on the free end of the other of said chains, said tightening means embodying an over-center lever attached to the free end of said one chain.

3. A stand for use in splicing cables comprising a pair of uprights arranged in linear spaced relation, a foot on the lower end of each of said uprights and adapted to engage a ground surface, a cross bar extending between said uprights intermediate the ends thereof and having one end detachably and pivotally secured to one of said uprights and having the other end detachably secured to the other of said uprights, a clamp means on the upper end of each of said uprights, said clamp means being in linear alignment and adapted to have a portion of a cable to be spliced extending therethrough, a pair of brace rods each having one end pivotally connected to an upright and having the other end pivotally supported in the adjacent one of spaced means provided in said cross bar, means connecting the lower ends of said uprights together, said means comprising a link chain carried by the lower end of one of said uprights, another link chain carried by the lower end of the other of said uprights, tightening means on the free end of one of said chains for applying tension to said connecting means and thereby pull the cable portion to a taut condition when extended through said clamp means, and a hook on said tightening means and detachably engageable with the link on the free end of the other of said chains.

References Cited in the file of this patent
UNITED STATES PATENTS

| 207,167 | Ericson | Aug. 20, 1878 |
| 786,765 | Hofeldt | Apr. 4, 1905 |
| 2,706,613 | Harris | Apr. 19, 1955 |
| 2,824,717 | Yeager | Feb. 25, 1958 |